(12) United States Patent
Nakagawa et al.

(10) Patent No.: US 7,935,908 B2
(45) Date of Patent: May 3, 2011

(54) JOINING METHOD, JOINING MACHINE, AND JOINT STRUCTURE OF DISSIMILAR MATERIAL

(75) Inventors: Shigeyuki Nakagawa, Yokosuka (JP); Minoru Kasukawa, Tokyo (JP); Kenji Miyamoto, Yokosuka (JP); Masayuki Inoue, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1162 days.

(21) Appl. No.: 11/633,629

(22) Filed: Dec. 5, 2006

(65) Prior Publication Data
US 2010/0129684 A1    May 27, 2010

(30) Foreign Application Priority Data
Dec. 6, 2005 (JP) .................. 2005-351851

(51) Int. Cl.
B23K 37/00 (2006.01)
B23K 31/02 (2006.01)

(52) U.S. Cl. ........... 219/121.12; 219/121.35; 219/121.6; 219/121.85; 228/125; 228/235.2

(58) Field of Classification Search ............. 219/121.63, 219/121.64, 121.85; 228/173.6, 232; 428/615, 428/686
See application file for complete search history.

(56) References Cited

U.S. PATENT DOCUMENTS

| | | | |
|---|---|---|---|
| 2,066,647 A * | 1/1937 | Rodman | 219/100 |
| 2,531,910 A * | 11/1950 | Hensel et al. | 420/529 |
| 4,056,657 A * | 11/1977 | Leckie et al. | 428/659 |
| 4,069,081 A * | 1/1978 | Drower et al. | 156/273.3 |
| 4,649,254 A * | 3/1987 | Bedell et al. | 219/121.64 |
| 5,316,863 A * | 5/1994 | Johnson et al. | 428/548 |
| 5,941,110 A * | 8/1999 | Cao et al. | 72/21.4 |
| 6,109,506 A * | 8/2000 | Blair et al. | 228/175 |
| 6,222,150 B1 * | 4/2001 | Nomura et al. | 219/78.02 |
| 6,608,278 B1 * | 8/2003 | Xie et al. | 219/121.64 |
| 6,715,667 B2 * | 4/2004 | Korischem et al. | 228/183 |
| 6,844,522 B1 * | 1/2005 | Wang et al. | 219/121.64 |
| 7,119,309 B2 | 10/2006 | Matsuoka et al. | |
| 7,131,567 B2 * | 11/2006 | Grong | 228/164 |
| 2005/0230371 A1 * | 10/2005 | Kutsuna et al. | 219/121.85 |

FOREIGN PATENT DOCUMENTS

CN      1657217 A      8/2005
(Continued)

OTHER PUBLICATIONS

Metals Handbook Ninth Edition vol. 6, pp. 496, 497 "Electrodes", copyright 1985.*

"Interface Behavior of Laser Welding Lap Joint Between Steel and Aluminum Alloy," Preprints of the National Meeting of Japan Welding Society, vol. 72, Apr. 2003, p. 152-153, English translation of Abstract.

*Primary Examiner* — Samuel M Heinrich
(74) *Attorney, Agent, or Firm* — Foley & Lardner LLP (57) ABSTRACT

A method of joining dissimilar materials of the present invention has a step of lapping a high melting point material on a low melting point material with a third material interposed therebetween. The third material is different from the high and low melting point materials. Further, the method has a step of irradiating an energy beam onto the high melting point material and a step of pressing the high and low melting point materials to cause eutectic melting between at least one of the high and low melting point materials and the third material and to join the high and low melting point materials in the form of a line.

10 Claims, 10 Drawing Sheets

FOREIGN PATENT DOCUMENTS

| JP | 62089586 A | * | 4/1987 |
| JP | 2005-169418 A | | 6/2005 |
| JP | 2006-175502 A | | 7/2006 |

* cited by examiner

JOINING METHOD, JOINING MACHINE, AND JOINT STRUCTURE OF DISSIMILAR MATERIAL

BACKGROUND OF THE INVENTION

1. Field of the Invention

The present invention relates to a technology to join dissimilar materials, or materials with different melting points, for example, such as a steel material and an aluminum alloy board. Specifically, the present invention relates to a method of joining dissimilar materials which joins a high melting point material and a low melting point material in the form of a line by irradiating the surface of the high melting point material with a high-energy beam while moving the high-energy beam, and relates to a joining machine used in such joining and a joint structure of the dissimilar materials joined by such a joining method.

2. Description of the Related Art

Generally, in joining dissimilar materials, if the both materials to be joined are melted in a similar way to a case of welding similar materials, a brittle intermetallic compound is produced. Accordingly, sufficient joint strength cannot be obtained between the dissimilar materials. For example, in the case of joining aluminum alloy and steel, which are dissimilar metals, a hard and brittle intermetallic compound, such as $Fe_2Al_5$ and $FeAl_3$, is produced. In order to ensure sufficient joint strength, such an intermetallic compound therefore needs to be controlled.

However, there is a dense and strong oxide film formed on the surface of the aluminum alloy. Removal of the oxide film requires a large amount of heat to be given to the joining, which results in growth of a thick intermetallic compound layer. The joined portion is therefore low in strength.

As described above, joining the dissimilar materials needs to be carried out with the growth of the intermetallic compound being precisely controlled. Accordingly, a method using a high-energy beam which allows precise temperature control, such as an electron beam or a laser beam, as an external heat source for heating has been attempted.

To control such production of the brittle intermetallic compound, the lap joint of the dissimilar materials using the high-energy beam is achieved by the following method. First, the high melting point material is irradiated with a high-energy beam defocused. The low melting point material is then melted by heat transfer from the high melting point material, so that the high and low melting point materials are joined to each other (see "PREPRINTS OF THE NATIONAL MEETING OF JAPAN WELDING SOCIETY", Japan Welding Society, p. 152, Vol. 72, April 2003). In this method, welding conditions are controlled so that only one of the materials (low melting point material) is melted in the joint interface to achieve the joint using diffusion of the material. The growth of the intermetallic compound layer can be therefore suppressed, and the thickness thereof can be thin. Accordingly, the strength per unit area at the joint is thought to be able to be made higher than that in the case of joint by melting the both materials.

SUMMARY OF THE INVENTION

However, to obtain proper joint strength by controlling the production of the intermetallic compound in the joint interface, the joint conditions need to be extremely precisely controlled. Moreover, the range of proper joint conditions is extremely narrow. Accordingly, even if the high-energy beam, whose conditions can be comparatively easily controlled, is used as the heat source as described above, the aforementioned method is difficult to industrially put into practical use.

The present invention was made in the light of the aforementioned problem in joining the dissimilar materials using the high-energy beam. An object of the present invention is to provide a method of joining dissimilar materials in which the joint strength can be increased and even if a dense oxide film is interposed in the joint interface, the oxide film can be removed from the joint portion without application of a large amount of heat. Another object of the present invention is to provide a machine to join dissimilar materials which is suitably used in such joining of the dissimilar materials and a joint structure of the dissimilar materials obtained by such a method.

The first aspect of the present invention provides a method of joining dissimilar materials comprising: laminating a high melting point material on a low melting point material with a third material interposed therebetween, the low melting point material having a melting point lower than that of the high melting point material, the third material being different from the high and low melting point materials; and irradiating an energy beam onto the high melting point material and then pressing the high and low melting point materials to cause eutectic melting between at least one of the high and low melting point materials and the third material and to join the high and low melting point materials in the form of a line.

The second aspect of the present invention provides a machine to join dissimilar materials comprising: an irradiation head disposed to move relative to materials to be joined including: a high melting point material; a low melting point material which is laminated on the high melting point material and has a melting point lower than that of the high melting point material; and a third material between the high and low melting point materials, the irradiation head irradiating an energy beam onto a joint portion of the high melting point material while relatively moving; and a pressure roller disposed behind an irradiation point of the energy beam in a moving direction of the irradiation point, the pressure roller pressing the irradiated joint portion of the high melting point material and a joint portion of the low melting point material to cause eutectic melting between at least one of the high and low melting point materials and the third material and to join the high and low melting point materials in the form of a line.

The third aspect of the present invention provides a joint structure of dissimilar materials comprising: a high melting point material; and a low melting point material having a melting point lower than that of the high melting point material, wherein the high and low melting point materials are joined to each other by laminating the high melting point material on the low melting point material with a third material interposed therebetween, the third material being different from the high and low melting point materials; and irradiating an energy beam onto the high melting point material and then pressing the high and low melting point materials to cause eutectic melting between at least one of the high and low melting point materials and the third material and to join the high and low melting point materials in the form of a line, new surfaces of the high and low melting point materials are joined to each other directly or through a reaction layer formed of the third material and at least one of the high and low melting point materials, and waste is discharged in the vicinity of joint portions of the high and low melting point materials, the waste including at least one of the third material, a component derived from the high and low melting point materials, oxide film, and a reaction product generated in the laminating, irradiating and pressing.

BRIEF DESCRIPTION OF THE DRAWINGS

The invention will now be described with reference to the accompanying drawings wherein.

DETAILED DESCRIPTION OF THE PREFERRED EMBODIMENTS

Hereinafter, a description is given of the present invention in detail mainly taking as an example joining of an aluminum alloy plate and a zinc-plated steel plate.

Figure 1:
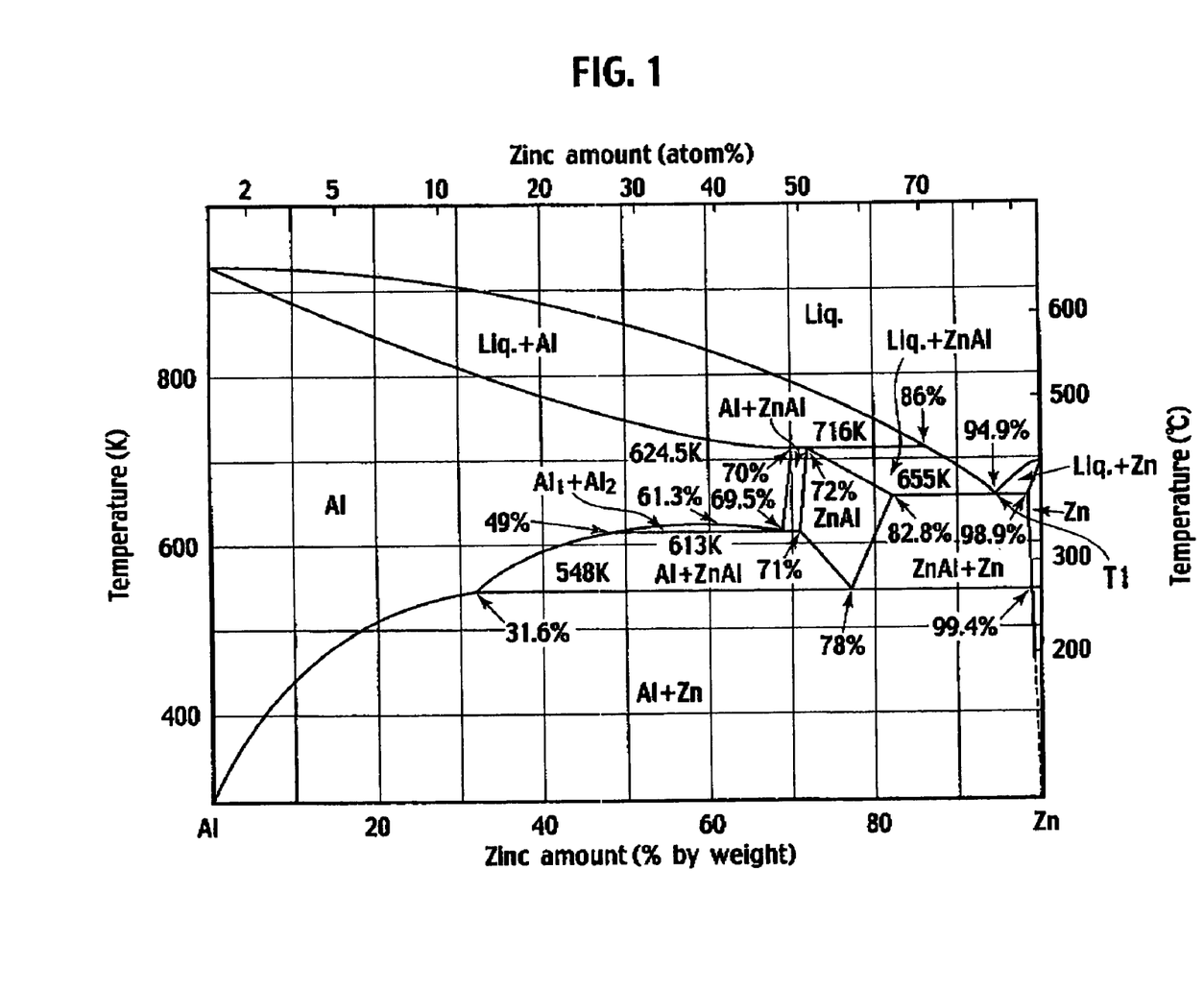
FIG. 1 is a graph showing a eutectic point in an Al—Zn binary phase diagram.

FIG. 1 shows a binary phase diagram of an aluminum (Al)-zinc (Zn) system. As shown in FIG. 1, a eutectic point (T1) in the Al—Zn system is 655 K, and a eutectic reaction occurs at a temperature much lower than the melting point of aluminum, which is 933 K.

In the present invention, eutectic melting of Al and Zn is caused utilizing the eutectic point shown in the graph and used for joining actions in joining the aluminum material, such as removal of an oxide film and mutual diffusion. This allows joining to be carried out at low temperature, and growth of intermetallic compound in the joint interface can be therefore suppressed extremely effectively.

The eutectic melting is described herein. The eutectic melting means melting using a eutectic reaction. Specifically, in the case where the composition of a mutual diffusion region generated by mutual diffusion of two types of metal (or alloy) is a eutectic composition, when holding temperature is equal to or higher than the eutectic temperature, a liquid phase is formed by the eutectic reaction. For example, in the case of aluminum and zinc, while melting points of aluminum and zinc are 933 K and 692.5 K, respectively, the eutectic alloy thereof is melted at 655 K, which is lower than these melting points. Accordingly, when cleaned surfaces of both metals are joined and kept heated to 655 K or more, a reaction occurs, which is called the eutectic melting. In this case, the eutectic composition includes 5% of aluminum and 95% of zinc. The eutectic reaction itself is a fixed change independent of alloy components. Moreover, the alloy composition just affects the amount of the eutectic reaction.

On the other hand, there is an oxide film on the surface of the aluminum material. The oxide film is physically broken by plastic deformation caused in the aluminum material. The plastic deformation of the aluminum material is caused by heating with irradiation by the high-energy beam and pressing at a predetermined temperature immediately after the heating. Further, the oxide film is broken by electric and thermal shock.

In the present invention, joining materials to be joined is achieved by the following principle. First, microscopic protrusions in the surfaces of the materials to be joined rub with each other at high temperature by heating and pressing. A part of the oxide film is therefore physically broken. In this broken portion, the eutectic melting occurs from a portion where aluminum and zinc are brought into contact with each other. In the vicinity thereof, the oxide film is broken and degraded by the generation of the liquid phase due to the eutectic melting. Moreover, further reactions occur, and the eutectic melting spreads all over the interface. The break of the oxide film and the joining through the liquid phase are promoted in such a manner.

The eutectic composition is voluntarily achieved by the mutual diffusion and does not need to be controlled. The essential condition is that the eutectic reaction with a low melting point occurs between two types of metals or alloys. In the case of the eutectic reaction of aluminum and zinc, when a Zn—Al alloy is used instead of zinc, at least 95% of zinc needs to be included in the alloy.

Figure 2:
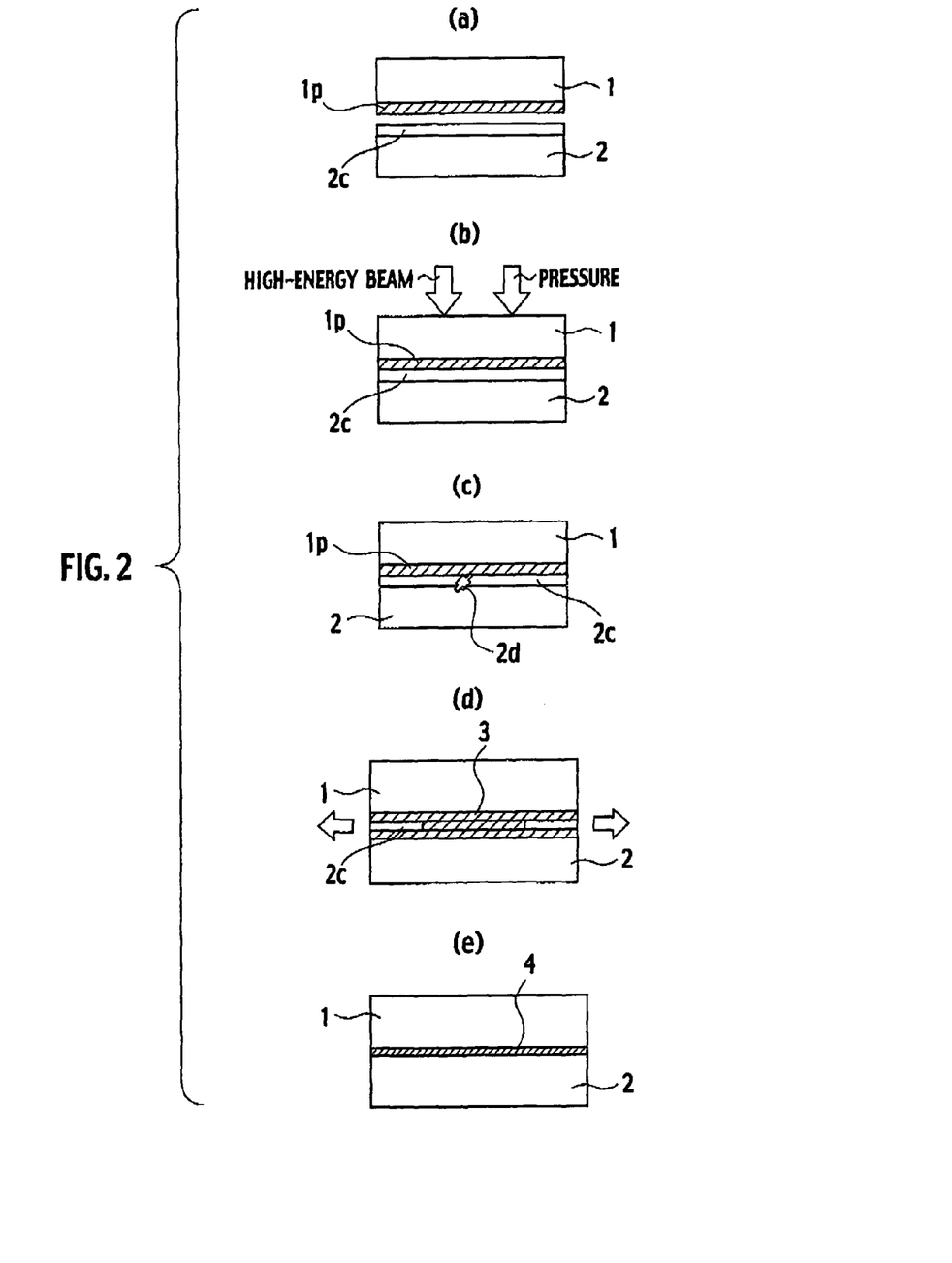
FIG. 2 is a schematic view showing a process of joining dissimilar materials according to the present invention.

As a process to join dissimilar materials, FIG. 2 shows an example of joining of a zinc-plated steel plate (high melting point material) and an aluminum alloy plate (low melting point material).

First, as shown in (a) of FIG. 2, a zinc-plated steel plate 1 and an aluminum alloy plate 2 are prepared. The zinc-plated steel plate 1 includes a zinc plating layer 1$p$ at least in a surface on the joint interface side. The zinc plating layer 1$p$ functions as a third metal material which forms eutectic together with Al.

Next, as shown in (b) of FIG. 2, the zinc-plated steel plate 1 and aluminum alloy plate 2 are laminated on each other with the zinc plating layer 1$p$ inside. There is an oxide film 2$c$ produced on the surface of the aluminum alloy plate 2. Furthermore, the zinc-plated steel plate 1 is irradiated with a high-energy beam such as an electron beam or a laser beam, and when the joint interface reaches a predetermined temperature range, pressure is applied for pressing of the joint surface. As shown in (c) of FIG. 2, plastic deformation by the pressing, thermal impact, and the like then locally breaks the oxide film 2$c$ at a microscopic contact portion in the surfaces of the materials to be joined, and the oxide film 2$c$ is locally broken to produce a broken portion 2$d$.

The break of the oxide film 2$c$ causes a local contact between zinc and aluminum. According to the temperature state at this time, as shown in (d) of FIG. 2, the eutectic melting of zinc and aluminum occurs. The waste is therefore discharged out of the joint portions (in a direction of an arrow). The waste includes at least one of zinc, a component derived from the materials to be joined, the oxide film 2c, and a eutectic melting alloy 3 generated in the joining process. The discharge of impurities allows a predetermined joint area to be ensured. Accordingly, as shown in (e) of FIG. 2, new surfaces of the aluminum alloy plate and steel plate are directly joined to each other by an extremely thin reaction layer 4, thus providing a strong metal joint of the steel plate 1 and aluminum alloy plate 2. In some cases, a thin diffusion layer of zinc is produced between the reaction layer 4 and the steel plate 1 depending on the materials and joint conditions. However, the diffusion layer has little effect on the joint strength and causes no practical problems.

A specific combination of the materials to be joined in the method of joining dissimilar materials of the present invention can be a combination of a steel plate and an aluminum alloy plate. At this time, the third material interposed between the both materials is not particularly limited as long as the third material forms low-melting point eutectic together with aluminum alloy. Examples of the third material can be zinc (Zn), copper (Cu), tin (Sn), silver (Ag), and nickel (Ni). Eutectic alloys of these metals and aluminum are melted at a temperature equal to or lower than the melting point of the aluminum alloy as a base material. Accordingly, in joining the steel plate and the aluminum alloy plate, which are more likely to produce a brittle intermetallic compound, the oxide film can be removed at low temperature, and the production of the intermetallic compound in the joint interface can be suppressed, thus providing a strong joint.

Moreover, when it is assumed that the joining method of the present invention is applied to assembly of an automobile body, most of the combinations of the materials to be joined are the combination of steel and aluminum materials. However, the combinations of the materials to be joined can be thought to include a combination of steel and magnesium materials and a combination of aluminum and magnesium materials in future.

Joining steel and magnesium materials, similar to later-described examples, can be carried out by causing the eutectic reaction between magnesium and zinc plated on steel. Moreover, in the case of joining aluminum and magnesium materials, zinc or silver can be also used as the third material.

In the present invention, the third material does not need to be limited to the aforementioned pure metals. There are binary eutectic alloys and ternary eutectic alloys, and the third material may be an alloy containing at least one of the above metals.

In the method of joining dissimilar materials of the present invention, as described above, the third material, which causes the eutectic reaction together with the materials to be joined, is interposed between the dissimilar materials to be joined to cause eutectic melting at the joining. Specific means for interposing the third material between the materials to be joined is desirably plating of the third material on at least one of the materials to be joined. This can eliminate a process to insert the third material between the materials to be joined as an insert material, thus increasing the working efficiency. Furthermore, after the plating layer melted by the eutectic reaction is discharged to the periphery of the joint portions together with impurities in the surfaces, extremely clean new surfaces emerge from under the plating layer. This can provide a strong joint.

In the aforementioned joining of dissimilar materials between the aluminum or magnesium alloy material and the steel material, the steel material can be a zinc-plated steel plate, which includes zinc plated in the surface thereof. Zinc can form low-melting point eutectic together with aluminum or magnesium. In such a case, new plating and special preparation are unnecessary, and commercially-available normal steel material with zinc plated for the purpose of preventing rust can be directly used. It is therefore possible to provide a strong joint of dissimilar materials extremely easily at low cost.

The method of joining dissimilar materials of the present invention is joining the joint portions of the materials to be joined along a predetermined joint line in the form of a line. The "form of a line" herein does not necessarily means only a continuous line but also means a discontinuous line (dashed line).

For such joining in the form of a line, the high-energy beam such as an electron beam or laser beam is continuously or discontinuously irradiated onto the high melting point material while being moved. In addition, it is desirable that pressure is continuously or discontinuously applied by a pressure roller to the joint portions behind a beam irradiation point in the moving direction of the beam. The pressure roller is placed at a position so as to follow the high-energy beam. The materials to be joined thus firmly adhere to each other by the application of pressure with the pressure roller in addition to the precise temperature control by the high-energy beam. In other words, the aforementioned operation causes local breaks of the oxide film in the surface of the material to be joined, from which the eutectic reaction is promoted. The oxide film is then removed at low temperature by the eutectic reaction, so that the new surfaces are joined to each other continuously or discontinuously. The movement of the high-energy beam at this time is relative movement. An irradiation head of the beam and the pressure roller may be moved, or the materials to be joined may be moved. In some cases, both of the irradiation head and pressure roller and the materials to be joined may be moved.

Note that a plurality of the pressure rollers may be placed along the moving direction. A role of eutectic reaction and discharge of reaction products and a role of diffusion welding can be therefore allocated to the different pressure rollers. This allows welding to be carried out at high speed and increases the working efficiency.

Figure 3:
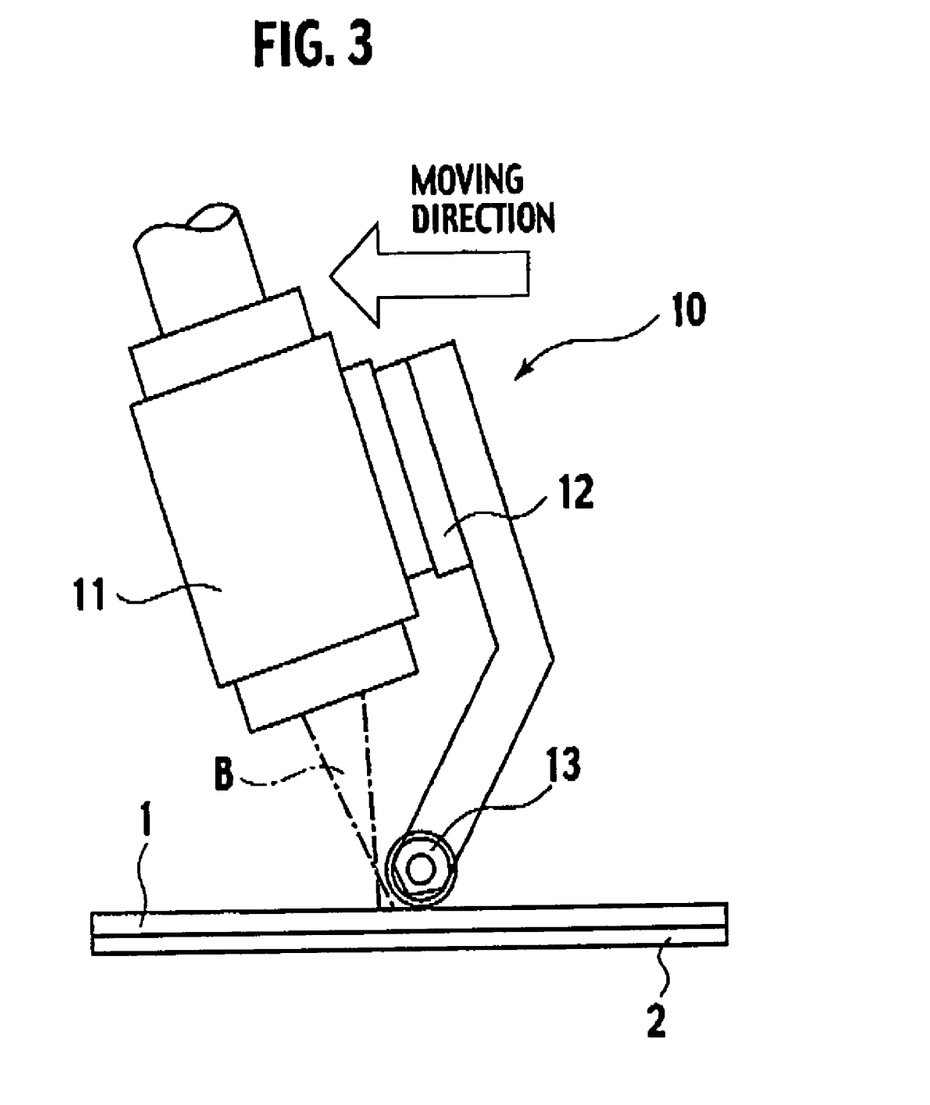
FIG. 3 is a schematic view showing an example of a joining machine of the present invention.

FIG. 3 shows an example of a machine used for the aforementioned joining of dissimilar materials. A joining machine 10 for dissimilar materials shown in FIG. 3 includes an irradiation head 11 and a pressure roller 13. The irradiation head 11 emits a YAG laser beam, which is a kind of high-energy beams. The pressure roller 13 is attached to the inside of the irradiation head 11 with a guide 12 interposed therebetween so as to vertically move. The guide 12 includes an air cylinder. The pressure applied by the pressure roller 13 to the materials 1 and 2 can be controlled by adjusting air pressure fed by the above air cylinder.

The pressure roller 13 is attached to the irradiation head 11 as described above and moves along the movement of a laser beam B. Specifically, the pressure roller 13 can move while pressing the materials 1 and 2 to be joined always at a position a certain distance apart from the laser beam B. The pressure roller 13 can follow the laser irradiation position when the materials to be joined are planar and even when the materials to be joined are three-dimensional like a vehicle body. The joining machine 10 can continuously and discontinuously join the zinc-plated steel plate 1 and aluminum alloy plate 2 in the form of a line by moving in a direction of an arrow in the drawing relative to the zinc-plated steel plate 1 and aluminum alloy plate 2.

The machine 10 includes various controllers and adjusters in addition to components shown in the drawing, which can adjust the irradiation angle and position of the laser beam B and the distance between the irradiation position and the pressing position.

Figure 4:
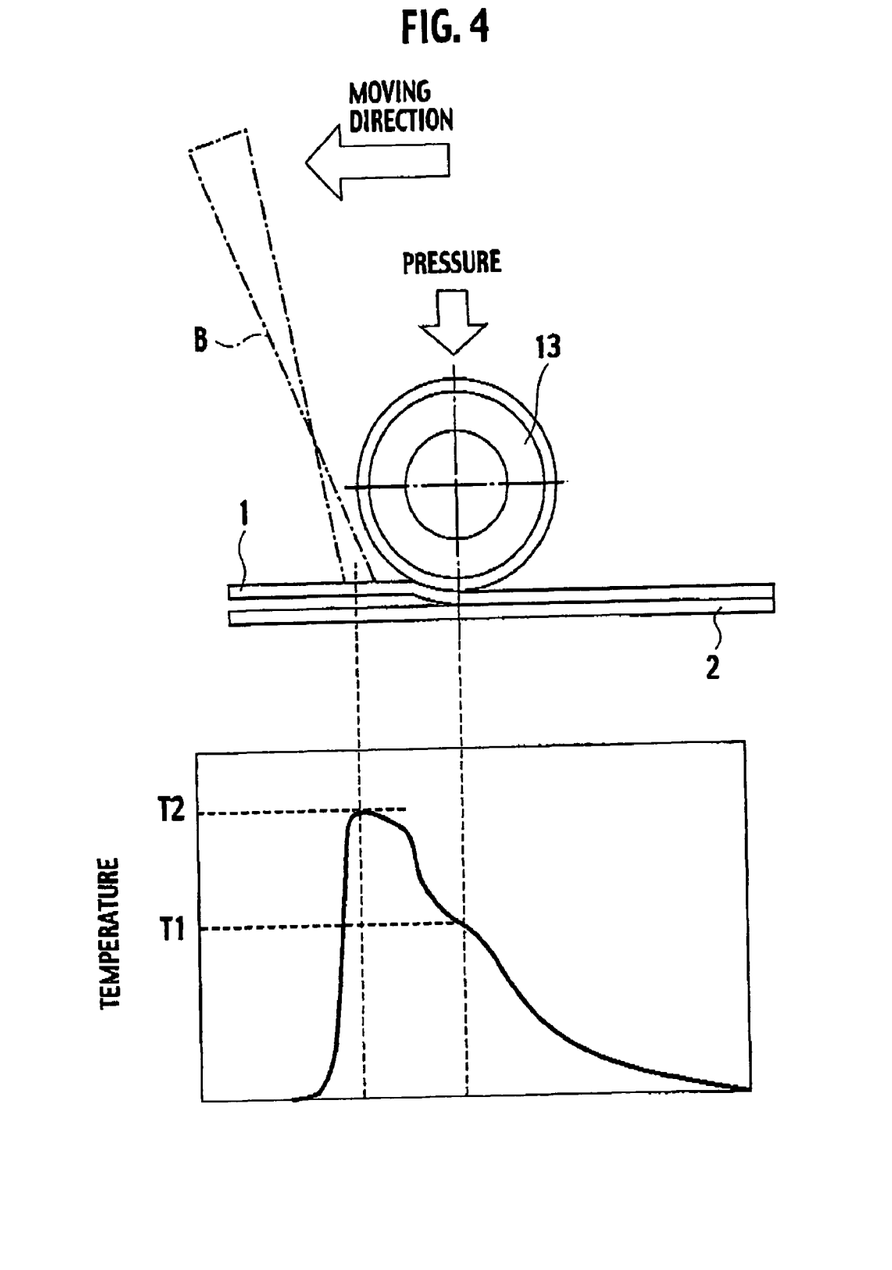
FIG. 4 is a graph showing a temperature distribution during joining in a joining method of the present invention.

FIG. 4 shows a configuration of the laser beam B and pressure roller 13 and a temperature distribution in the joint interface in terms of positions of the laser beam B and pressure roller 13. In FIG. 4, first the zinc-plated steel plate 1 is laminated on the aluminum alloy plate 2 with a slight gap which can be normally produced therebetween. Next, the zinc-plated steel plate 1 as the high melting point material is irradiated with the laser beam B which is defocused, that is, focused in front of the material surface. Specifically, the laser beam B is irradiated under such conditions that the temperature in the joint interface is in a temperature range where the steel plate 1 is not melted and zinc as the surface plating layer does not vaporize, that is, a temperature range of not higher than a boiling point T2 of zinc. Thereafter, a predetermined pressure is applied by the pressure roller 13 to cause the aluminum alloy plate 2 and the zinc-plated steel plate 1 to be plastically deformed and firmly adhere to each other. At this time, the temperature of the aluminum alloy plate 2 in the joint surface is increased by heat transfer from the zinc-plated steel plate 1 at high temperature. Moving speed of the laser beam B and pressure roller 13 is controlled for welding so that the temperature at the pressing reaches the eutectic temperature T1 of aluminum and zinc or higher.

Figure 5:
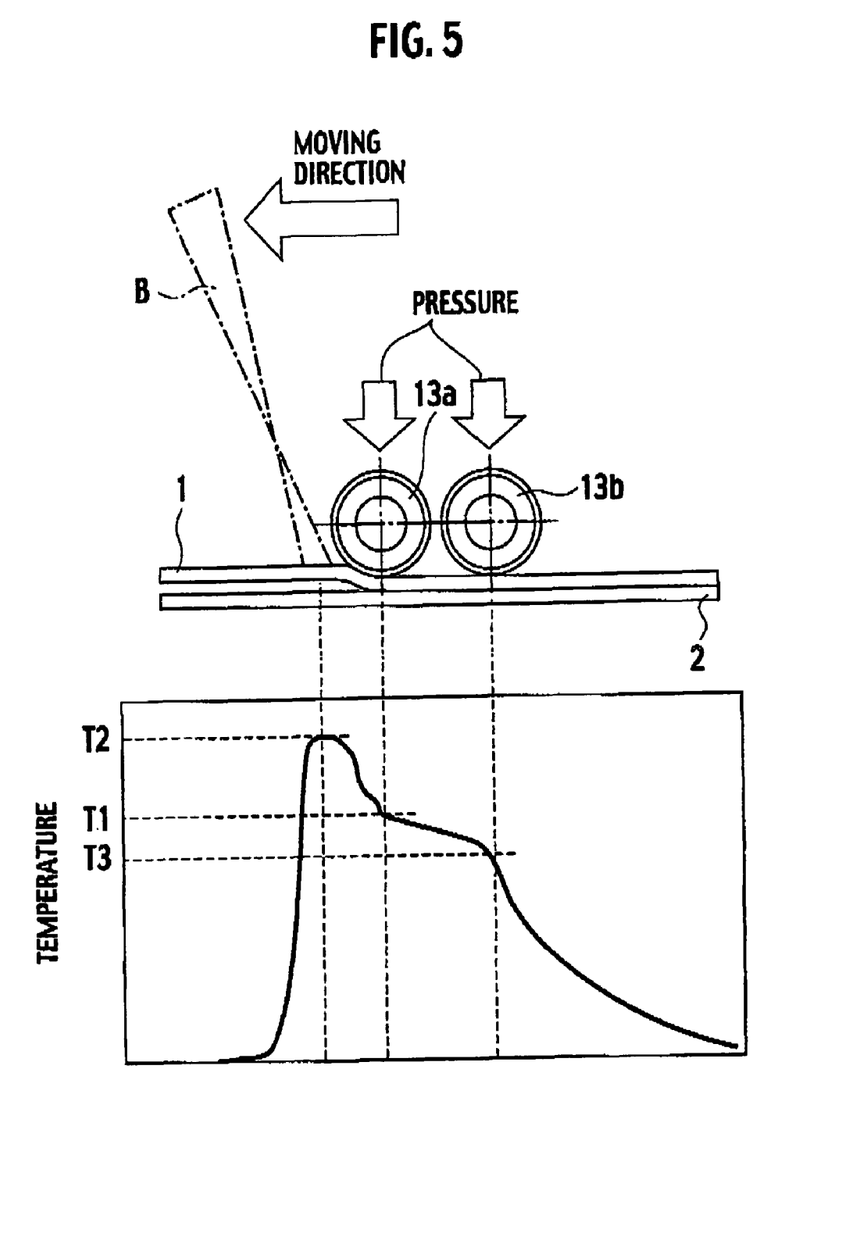
FIG. 5 is a graph showing a temperature distribution when two pressure rollers are used in the joining method of the present invention.

FIG. 5 shows a configuration including a plurality of pressure rollers (two pressure rollers in FIG. 5) and a temperature distribution in the joint interface in terms of positions of the laser beam B and pressure rollers 13a and 13b. The zinc-plated steel plate 1 is laminated on the aluminum alloy plate 2 with a slight gap which can be normally produced therebetween. Next, the zinc-plated steel plate 1 as the high melting point material is irradiated with the laser beam B defocused. At this time, in a similar manner to the machine shown in FIG. 4, the laser beam B is irradiated at such conditions that the temperature in the joint interface is in the temperature range of not higher than the boiling point T2 of zinc, where the steel plate 1 is not melted and zinc in the surface plating layer does not vaporize. Thereafter, a predetermined pressure is applied by a first pressure roller 13a to cause the aluminum alloy plate 2 and the zinc-plated steel plate 1 to be plastically deformed and firmly adhere to each other. The temperature of the aluminum alloy plate 2 in the joint surface is then increased by heat transfer from the zinc-plated steel plate 1. At this time, moving speed of the laser beam B and first and second pressure rollers 13a and 13b is controlled so that the temperature in the joint interface reaches the eutectic temperature T1 of aluminum and zinc or higher. The eutectic reaction of aluminum and zinc thus occurs, and the eutectic melting alloy, oxide film, and impurities in the joint interface are discharged from the joint interface to the periphery of the joint portions by pressing with the first pressure roller 13a.

Herein, the joint interface is further pressed by the second pressure roller 13b. Accordingly, the active new surfaces with the impurities removed firmly adhere to each other at a predetermined pressure and a temperature T3 effective for the diffusion welding, which can provide strong welding.

In this embodiment, the first pressure roller 13a, which functions mainly in the eutectic reaction and discharge, and the second pressure roller 13b, which functions mainly in the discharge and pressure contact, are provided to share the roles. This allows welding to be carried out at high speed and accordingly increases the working efficiency.

In the method of joining dissimilar materials of the present invention, as described in FIG. 2, first, the eutectic reaction is caused. Thereafter, the oxide film, impurities in the joint interface, and the like are discharged from the joint interface to the periphery of the joint portions together with the eutectic melting metal. This allows the new surfaces of the materials to be joined to be directly reacted, providing a strong joint. Accordingly, in the joint process, it is important how the oxide film and the like are surely discharged from the joint interface in a short time. For example, the surface of the pressure roller which comes into contact with one of the materials to be joined is configured to have a cross section convex in center part. This further facilitates the discharge of the eutectic melting alloy, oxide film, impurities, and the like, thus providing a strong joint between the new surfaces.

Figure 6:
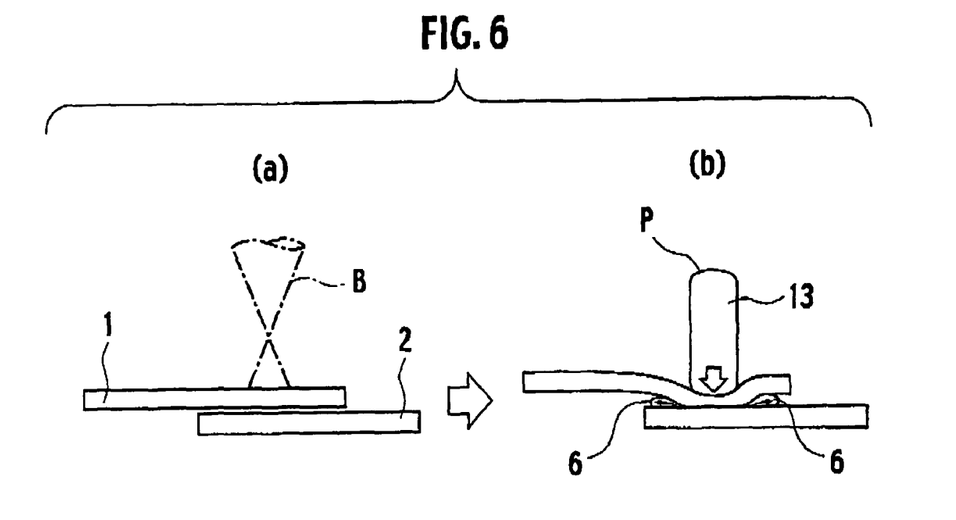
FIG. 6 is an explanatory view showing a state where waste is discharged when a pressure roller with a convex circumferential surface is used in the joining method of the present invention.

FIG. 6 shows the pressure roller 13 having a convex curve surface P with a curvature in the outer circumference of the pressure roller 13 which is a surface coming into contact with one of the materials to be joined. As shown in (a) of FIG. 6, the zinc-plated steel plate 1 and aluminum alloy plate 2 are laminated on each other, and the laser beam B defocused is irradiated thereon. As shown in (b) of FIG. 6, the portion irradiated by the laser beam B is then pressed by the pressure roller 13 with the convex surface. The eutectic melting thus occurs in the joint interface, and waste 6 including the oxide film and impurities in the joint interface is easily discharged out of the joint portions. The dissimilar materials 1 and 2 are therefore directly joined through the new surfaces, and a strong metal joint can be thus obtained.

Preferably, the pressure roller having such a convex curve surface P in the outer circumference is provided at least just behind the irradiation position of the laser beam so as to serve as the roller for eutectic reaction and discharge. Specifically, such a roller is preferably used as the first pressure roller 13a shown in FIG. 5.

Moreover, from the same perspective as that described above, it is preferable that a discharge promoter to facilitate discharging the waste is provided for the joint portion of one of or both of the materials to be joined.

Figure 7:
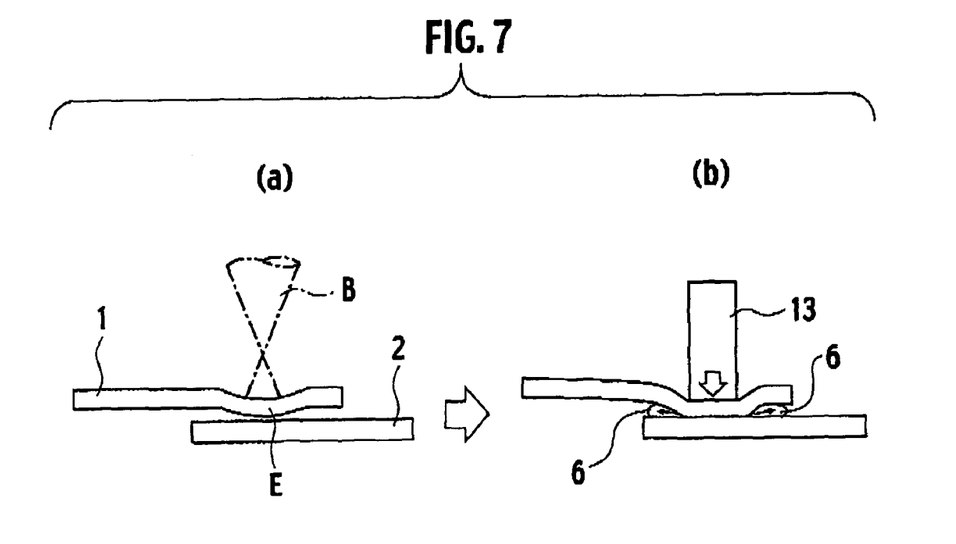
FIG. 7 is an explanatory view showing a state where the waste is discharged when the discharge promoter is provided for one of materials to be joined in the joining method of the present invention.

As an example of such a discharge promoter, FIG. 7 shows an example in which a bulge E bulging on the joint interface side is previously formed in the joint portion of the zinc-plated steel plate 1. The bulge E can be composed of a bulge continuously provided along the welding line or a plurality of bulges discontinuously provided.

Specifically, as shown in (a) of FIG. 7, first, the zinc-plated steel plate 1 including the bulge E protruding toward the aluminum alloy board 2 is laminated on the aluminum alloy plate 2. Thereafter, the laser beam B defocused is irradiated onto the bulge E. Just after that, a predetermined pressure is applied by the pressure roller 13 to cause the both materials 1 and 2 to be plastically deformed and firmly adhere to each other. At this time, since the bulge E is formed in the zinc-plated steel plate 1, the waste 6 including the oxide film and impurities in the joint surfaces can be easily discharged by pressing with the pressure roller 13 from the joint interface to the periphery of the joint portions together with the eutectic melting alloy. Accordingly, the new surfaces of the aluminum alloy and steel are directly joined, thus providing a strong metal joint.

Even when the pressure roller in such a case is a normal cylindrical pressure roller, good discharge properties can be obtained as well as the pressure roller with the convex curve surface P. In the example shown in the drawing, the bulge E is provided for the zinc-plated steel plate 1 but may be formed in the aluminum alloy plate 2 or in each of the materials 1 and 2.

Figure 8:
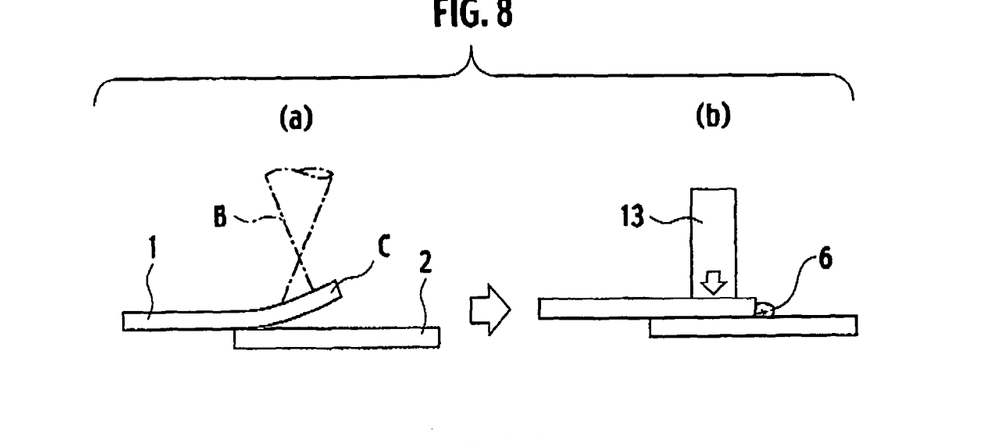
FIG. 8 is an explanatory view showing a state where the waste is discharged when another discharge promoter with a different shape is provided for one of the materials to be joined in the joining method of the present invention.

As another example of the discharge promoter, FIG. 8 shows an example in which a warpage C warping in a direction away from the aluminum alloy plate 2 is formed in a joint end of the zinc-plated steel plate 1. As shown in (a) of FIG. 8, the warpage C is previously formed in the end of the joint portion of the zinc-plated steel plate 1. The zinc-plated steel board 1 is then laminated on the aluminum alloy plate 2. The laser beam B defocused is irradiated on the warpage C, and the both materials are immediately caused to firmly adhere to each other with the pressure roller 13. This facilitates the discharge of the waste 6 from the joint interface to the joint end, thus providing a strong metal joint.

Furthermore, the joining method of the present invention can be carried out in the following manner. A warpage is formed in the joint end of the low melting point material, and the high melting point material is then irradiated by the high-energy beam through a gap formed by the warpage. The high-energy beam can be thus irradiated onto the high melting point material from the side of the low melting point material, thus considerably extending the flexibility in welding work.

For the purpose of reducing fuel consumption and improving driving performances by weight reduction of a vehicle body, a body structure using light alloy such as aluminum alloy for a body panel is being required. Moreover, making a roof panel of light alloy allows the vehicle body to have a lower center of gravity, which improves the dynamic performance. In the case of making a roof panel of an aluminum alloy, the roof panel made of an aluminum alloy is laminated on a steel member constituting a body frame. Thereafter, the laser beam has to be irradiated from the outside of the vehicle body, that is, from the aluminum alloy side. Accordingly, the aforementioned method of joining dissimilar materials cannot be applied thereto.

Practically, therefore, the roof panel made of aluminum alloy is joined to a vehicle body frame member made of steel by mechanical fastening with rivets inserted from the aluminum alloy side. However, such a method may increase the weight or costs or limit the flexibility in an exterior design in some cases.

Figure 14:
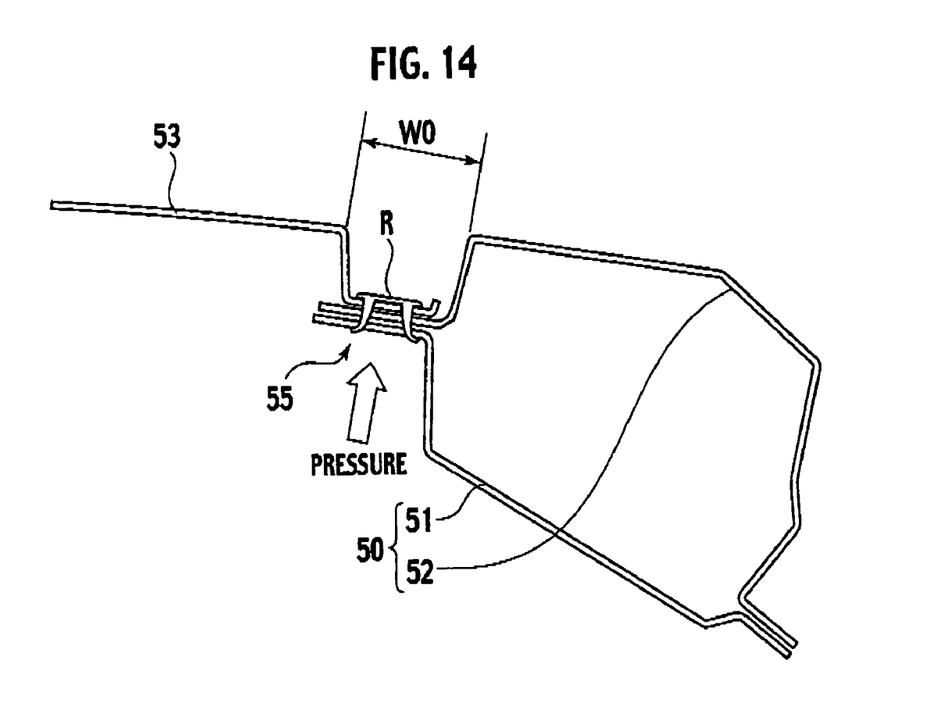
FIG. 14 is a schematic cross-sectional view showing an example of a joint structure of the steel vehicle body member and the aluminum roof panel by means of rivets.

FIG. 14 shows an example of a joint structure of panels of dissimilar metals by such rivet fastening. A vehicle body member 50 is fabricated by welding a steel rail inner 51 and a steel rail outer 52. A roof panel 53 made of light alloy is laminated on the vehicle body member 50. A plurality of rivets R are then inserted into a joint flange 55 of the vehicle body member 50 from the roof panel side to join the roof panel 53 and the vehicle body member 50 in the form of dots. Such insertion of the rivets R requires a support from the inside of the vehicle (in a direction of an arrow in the drawing). This reduces the flexibility in designing the position of the joint flange 55. Moreover, a flange width W0 is made wider than the diameter of the rivets R, and the exterior design is degraded.

On the other hand, in the joining method of the present invention, the warpage is formed in the joint end of the low melting point material, and the high-energy beam is irradiated onto the high melting point material through the gap formed by the warpage. Accordingly, the joining method of the present invention using eutectic melting can be carried out by irradiation with the high-energy beam from the low melting point material side.

Figure 9:
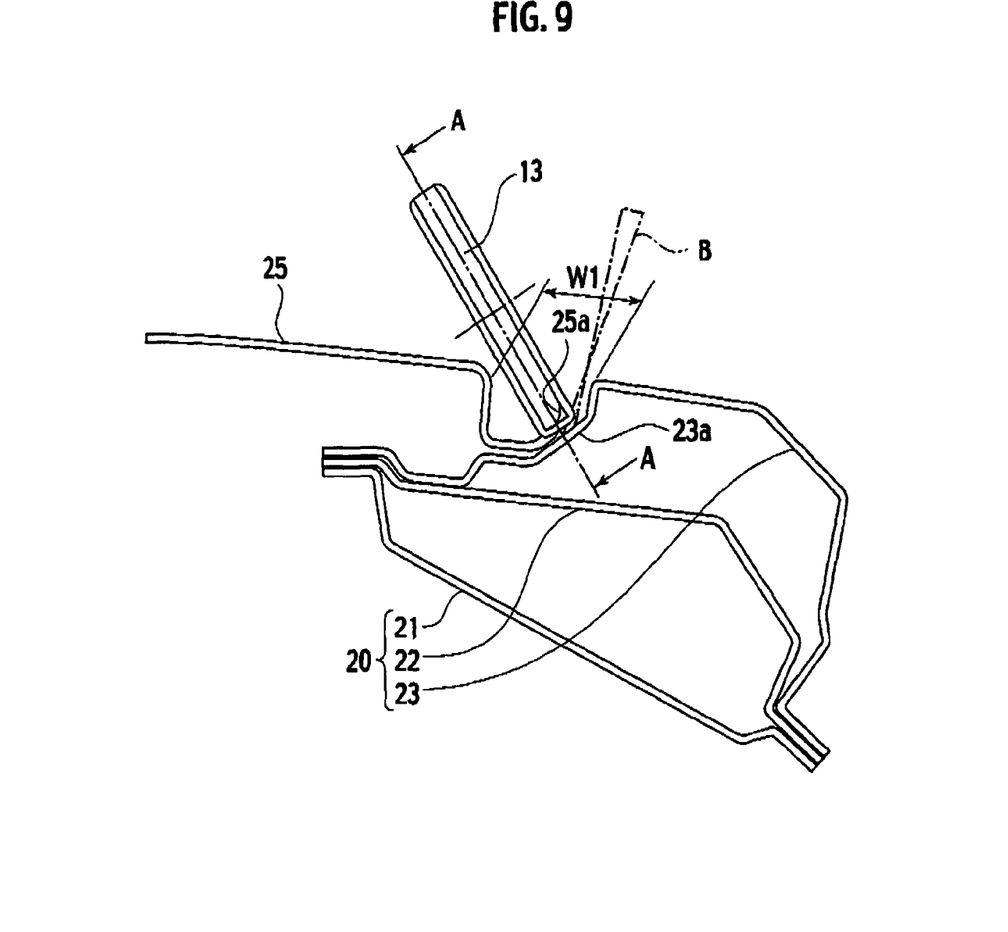
FIG. 9 is a schematic cross-sectional view showing an example of a joint structure of a steel vehicle body member and an aluminum roof panel as an example of the joining method of the present invention.

FIG. 9 shows an example of joining of the vehicle body member made of steel and the roof panel made of light alloy in the present invention. A vehicle body member 20 is fabricated by welding a steel rail inner 21, a steel rail outer 22, and a steel side outer 23. A roof panel 25 made of aluminum alloy is laminated on the vehicle body member 20. The vehicle body member 20 includes an inclined surface 23a for joining. The side outer 23 is made of a zinc-plated steel plate with the surface plated with zinc. The other steel members may be certainly made of a zinc-plated steel plate.

On the other hand, a warpage 25a is formed at the end of a flange in the roof panel 25 made of aluminum alloy. The laser beam B defocused can be irradiated onto the inclined surface 23a of the side outer 23 from an open side of the warpage 25a.

The pressure roller 13 is disposed so as to press the warpage 25a against the inclined surface 23a heated by the laser beam B.

Figure 10:
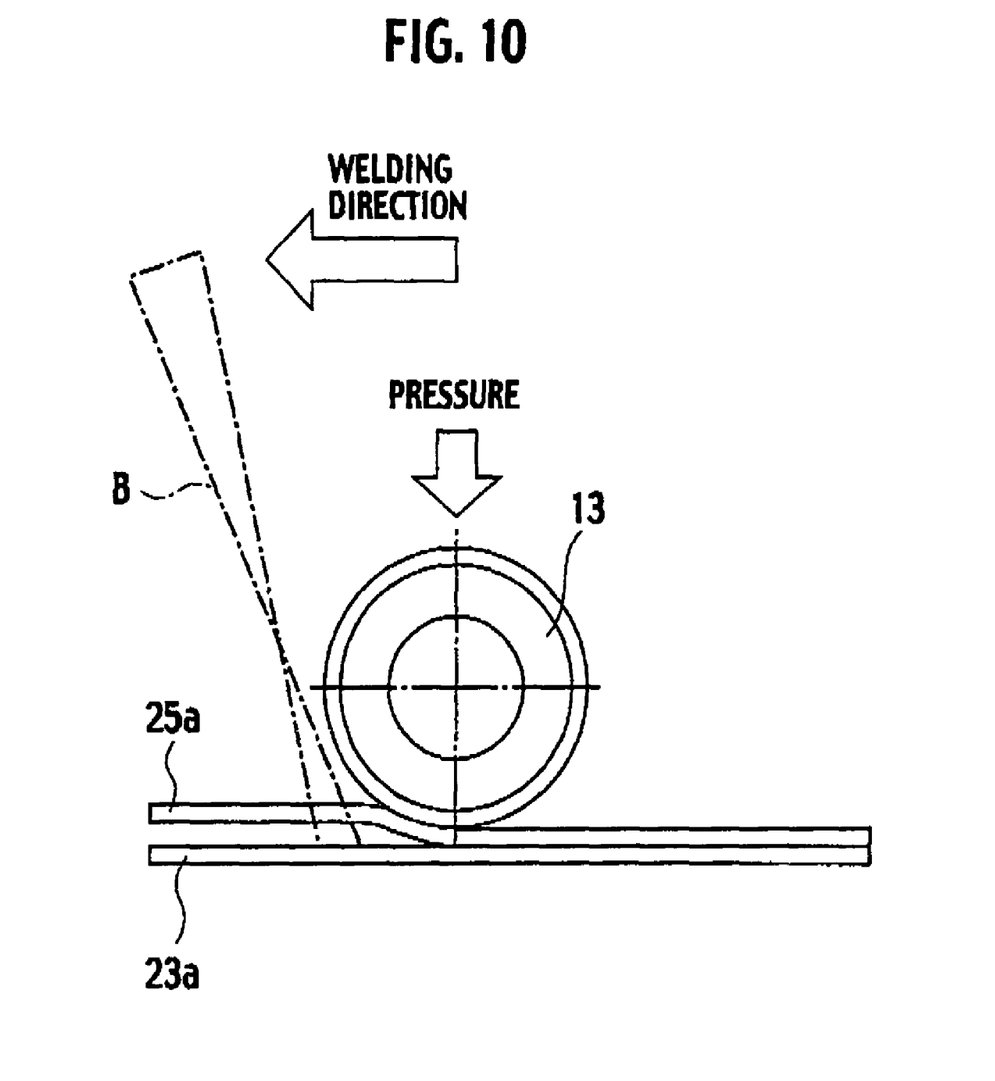
FIG. 10 is a cross-sectional view taken along a line A-A of FIG. 9.
Figure 11:
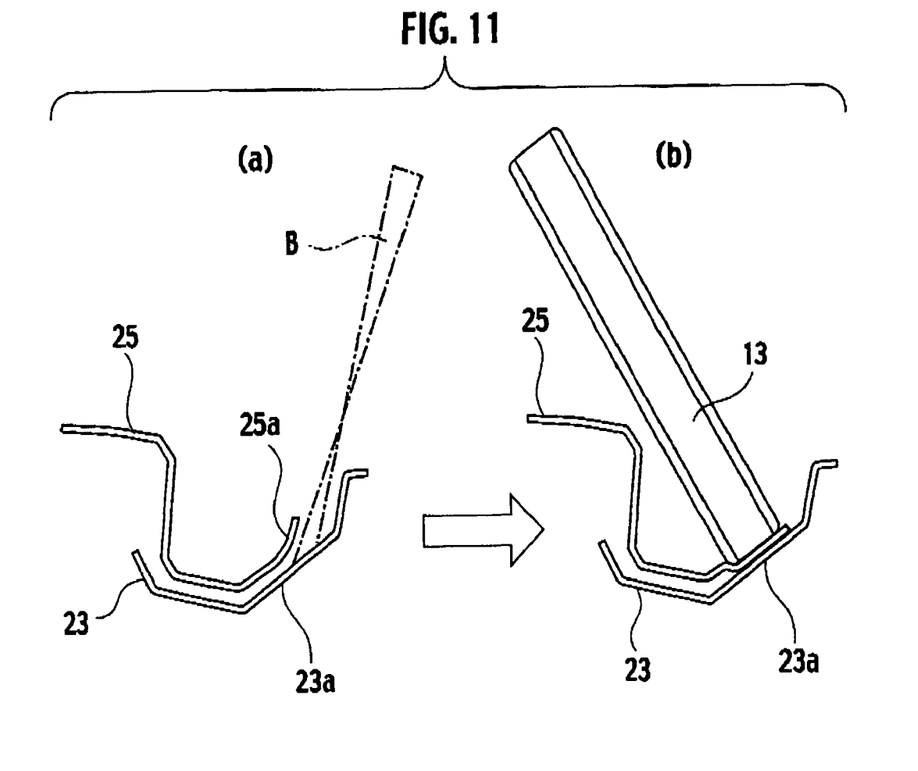
FIG. 11 is an enlarged view of a main portion of FIG. 9.

FIG. 10 is a cross-sectional view taken along a line A-A of FIG. 9. The laser beam B and pressure roller 13 are disposed so as to move relative to the vehicle body member 20. FIG. 11 is an enlarged view of a main portion of FIG. 9. First, as shown in (a) of FIG. 11, the laser beam B is irradiated onto the inclined surface 23a from the roof panel 25 side through a gap formed between the end of the warpage 25a and the inclined surface 23a. The vicinity of the joint portion of the inclined surface 23a is thus heated to a predetermined temperature. Just behind the laser beam B, as shown in (b) of FIG. 11, the warpage 25a of the roof panel 25 is pressed by the pressure of the pressure roller 13 against the inclined surface 23a. The warpage 25a thus firmly adheres to the inclined surface 23a of the side outer 23. The joint interface is then maintained by heat transfer from the side outer 25 at temperature where the eutectic reaction occurs, and pressure is further applied thereto by the pressure roller 13. The roof panel 25 is joined to the side outer 23 of the vehicle body member 20 in such a manner.

Herein, the rigidity of the vehicle body member 20, which is a steel structure member, is sufficiently higher than that of the warpage 25a of the roof panel 25, which is made of aluminum alloy. Accordingly, there is no need to provide a support against the pressure by the pressure roller 13 from the inside of the vehicle. The joint position and joint structure of the roof panel 25 and vehicle body member 20 can be therefore set comparatively freely. Consequently, the flexibility in design can be increased, and the joint flange width (W1) can be made narrow.

Figure 12:
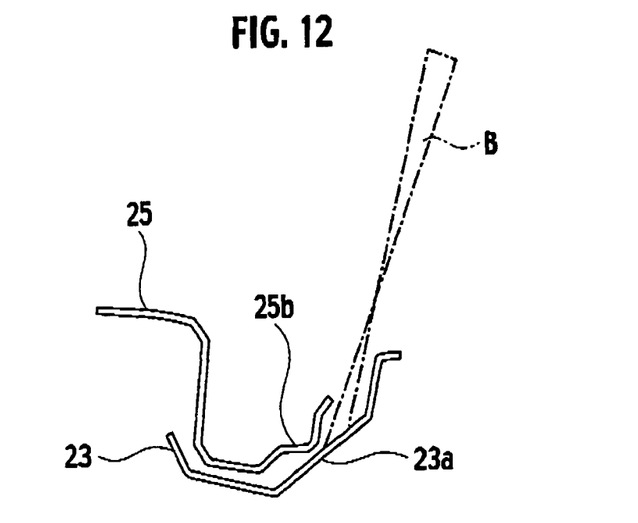
FIG. 12 is a cross-sectional view showing another shape of a warpage in the joint structure shown in FIG. 9.

At this time, the shape of the warpage 25a of the roof panel 25 is not limited to only the warped shape having a curvature as shown in FIG. 11. For example, as shown in FIG. 12, the roof panel 25 can include a warpage of various shapes, such as a convex warpage 25b protruding on the side outer 23 side.

Figure 13:
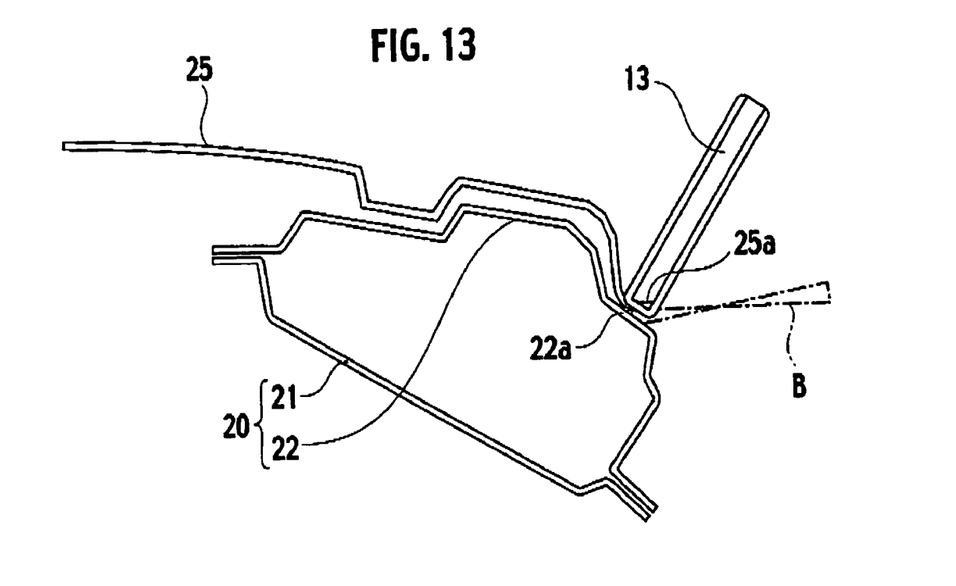
FIG. 13 is a schematic cross-sectional view showing another example of the joint structure of the steel vehicle body member and the aluminum roof panel.

FIG. 13 shows another example of joining of a vehicle body member made of steel and a roof panel made of light alloy. The vehicle body 20 is fabricated by welding the steel rail inner 21 and the steel rail outer 22. The roof panel 25 made of aluminum alloy is extended from above the vehicle body member 20 to the vicinity of the end of the vehicle body member 20. The roof panel 25 is joined to the inclined surface 22a, which is formed in the rail outer 22, in a similar manner to the above description.

Hereinafter, the present invention is specifically described based on examples, but the present invention is not limited by these examples.

Example 1

As shown in FIG. 3, the zinc-plated steel plate 1 with a thickness of 0.55 mm (high melting point material, zinc plating thickness: about 5 μm) was laminated on the 6000 series aluminum alloy plate 2 (low melting point material) with a thickness of 1.0 mm. Thereafter, the YAG laser beam B was irradiated on the steel plate 1 by the irradiation head 11 from the steel plate 1 side while pressure was applied just behind the laser beam B by the pressure roller 13. At this time, the irradiation head 11 and pressure roller 13 were moved in the direction of the arrow in the drawing relative to the materials 1 and 2, thus continuously joining the materials 1 and 2 in the form of a line.

The joint conditions were as follows: a YAG laser oscillator with a maximum power of 3 kW and a lens with a focal length of 150 mm were used; and the laser beam B was defocused so that spot diameter on the surface of the zinc-plated steel plate 1 was 3.5 mm. Moreover, welding was carried out with a YAG laser output of 1.0 kW; a moving speed of 1.0 m/min; and a pressure by the pressure roller 13 of 100 MPa. Furthermore, during the laser irradiation, argon gas (inert gas) was flown at a flow rate of 25 L/min from a nozzle which was coaxial with the laser beam B to shield the joint region.

A macro specimen was then cut from the obtained joint product. According to observation of macro texture of the joint, the new surfaces of the aluminum alloy and steel were directly joined. Moreover, the waste composed of the oxide film and reaction products such as eutectic melting alloy was found to be discharged to each side of the joint.

Example 2

Joining the vehicle body member 20 (high melting point material) made of steel and the roof panel 25 (low melting point material) made of aluminum alloy as shown in FIG. 9 was carried out.

The rail inner 21, rail outer 22, and side outer 23 constituting the vehicle body member 20 each were made of a zinc-plated steel plate and have thicknesses of 1.2, 1.4, and 0.55 mm, respectively. The zinc plating thickness thereof was about 5 μm.

On the other hand, the roof panel 25 made of aluminum alloy was composed of a 6000-series aluminum alloy plate with a thickness of 1.0 mm. The warpage 25a with a curvature of 12 mm was formed at the end of the flange. When the roof panel 25 was laminated on the body member 20, therefore, a 5 μm gap was formed between the roof panel 25 and the side outer 23.

As shown in FIGS. 10 and 11, a Nd:YAG laser beam was moved while being irradiated on the inclined surface 23a from the irradiation head positioned on the aluminum alloy roof panel 25 side through the gap formed by the warpage 25a. Furthermore, the warpage 25a of the roof panel 25 was pressed against the inclined surface 23a by application of pressure of the pressure roller 13. The end of the flange of the roof panel 25 was thus joined with the side outer 23 in the form of a continuous liue.

At this time, a YAG laser oscillator with a maximum output of 3 kW and a lens with a focal length of 150 mm were used. Furthermore, after the laser irradiation, the warpage 25a was caused to firmly adhere to the side outer 23 by the pressure roller 13. The laser output, feeding speed, and pressure of the pressure roller 13 were set to 0.8 kW, 0.7 to 1.0 m/min, and 120 MPa, respectively, so that the temperature in the joint interface reached temperature causing eutectic melting. The beam B was defocused to be irradiated so that the spot diameter was 3.5 mm on the surface of the side outer 23. Moreover, during the laser irradiation, argon gas was flown at a flow rate of 25 L/min to shield the joint portions.

A macro specimen was then cut from the obtained joint product. Similar to the above example, observation of the texture of the joint revealed that a good joint structure was obtained.

The entire content of a Japanese Patent Application No. P2005-351851 with a filing date of Dec. 6, 2005 is herein incorporated by reference.

Although the invention has been described above by reference to certain embodiments of the invention, the invention is not limited to the embodiments described above and modifications may become apparent to these skilled in the art, in light of the teachings herein. The scope of the invention is defined with reference to the following claims.

What is claimed is:

1. A method of joining dissimilar materials, comprising:
   laminating a high melting point material on a low melting point material with a third material interposed therebetween, the low melting point material having a melting point lower than that of the high melting point material, the third material being different from the high and low melting point materials; and
   irradiating an energy beam onto the high melting point material and then pressing the high and low melting point materials to cause eutectic melting between at least one of the high and low melting point materials and the third material to join the high and low melting point materials in the form of a line.

2. A method of joining dissimilar materials according to claim 1, wherein at least one of the high and low melting point materials is plated with the third material.

3. A method of joining dissimilar materials according to claim 2, wherein one of the high and low melting point materials is a steel plate and the third material is zinc plated on the steel plate.

4. A method of joining dissimilar materials according to claim 1, wherein the energy beam is irradiated while being moved relative to the high and low melting point materials, and the high and low melting point materials are pressed by a pressure roller disposed behind an irradiation point of the energy beam in a moving direction of the irradiation point.

5. A method of joining dissimilar materials according to claim 4, wherein the high and low melting point materials are pressed using a plurality of pressure rollers.

6. A method of joining dissimilar materials according to claim 4, wherein a surface of the pressure roller which is brought into contact with one of the high and low melting point materials is convexly curved.

7. A method of joining dissimilar materials according to claim 1, wherein a discharge promoter is provided in the vicinity of at least one of joint portions of the high and low melting point materials,
   wherein the discharge promoter facilitates discharge of waste, including at least one of the third material, a component derived from the high and low melting point materials, an oxide film, and a reaction product generated during the laminating, irradiating and pressing.

8. A method of joining dissimilar materials according to claim 1, wherein a joint portion of the low melting point material is warped to form a warpage in a direction away from the high melting point material, and the energy beam is irradiated onto the high melting point material through a gap formed by the warpage.

9. A method of joining dissimilar materials according to claim 1, wherein the eutectic melting occurs between the low melting point material and the third material.

10. A method of joining dissimilar materials according to claim 9, wherein the energy beam heats the high melting point material to a temperature at which the high melting point material is not melted, the third material does not vaporize, and the eutectic melting occurs between the low melting point material and the third material.

\* \* \* \* \*